(12) United States Patent
Weir

(10) Patent No.: US 10,388,458 B2
(45) Date of Patent: Aug. 20, 2019

(54) ENHANCED STACKING FOR IMPROVED CAPACITANCE

(71) Applicant: EEStor, Inc., Cedar Park, TX (US)

(72) Inventor: Richard D. Weir, Cedar Park, TX (US)

(73) Assignees: EEStor, INC.; Cedar Park, Inc.

(*) Notice: Subject to any disclaimer, the term of this patent is extended or adjusted under 35 U.S.C. 154(b) by 0 days.

(21) Appl. No.: 15/622,623

(22) Filed: Jun. 14, 2017

(65) Prior Publication Data

US 2017/0278636 A1    Sep. 28, 2017

Related U.S. Application Data

(63) Continuation-in-part of application No. 15/533,617, filed as application No. PCT/US2015/064290 on Dec. 7, 2015.

(Continued)

(51) Int. Cl.
*H01G 4/38* (2006.01)
*H01G 4/30* (2006.01)
(Continued)

(52) U.S. Cl.
CPC ............. *H01G 4/30* (2013.01); *H01G 4/0085* (2013.01); *H01G 4/1227* (2013.01); *H01G 4/14* (2013.01);
(Continued)

(58) Field of Classification Search
CPC ............ H01G 4/30; H01G 4/012; H01G 4/38; H01G 7/02; H01G 4/385; H01G 4/12; H01G 4/1227; H01G 4/005; H01G 4/14
(Continued)

(56) References Cited

U.S. PATENT DOCUMENTS 6,078,474 A    6/2000 Koyanagi et al.
6,078,494 A *  6/2000 Hansen ................ H01G 4/1227
                                                361/321.5

(Continued)

FOREIGN PATENT DOCUMENTS

WO    2016094310 A1    6/2016

OTHER PUBLICATIONS

International Search Report and Written Opinion for International Application No. PCT/2015/064290, dated May 24, 2016, 11 pages.

*Primary Examiner* — Eric W Thomas
*Assistant Examiner* — Arun Ramaswamy
(74) *Attorney, Agent, or Firm* — Toler Law Group, PC

(57) ABSTRACT

A capacitor includes a first conductive plate, a second conductive plate, a floating conductive plate and a dielectric material separating the floating conductive plate from the first conductive plate and from the second conductive plate. The floating conductive plate has a first surface closer to the first conductive plate than to the second conductive plate and has a second surface closer to the second conductive plate than to the first conductive plate. In response to an electric field between the first conductive plate and the second conductive plate, charge separation is induced in the floating conductive plate such that a first charge induced on the first surface has a first polarity and a second charge induced on the second surface has a second polarity, where the second polarity different from the first polarity.

48 Claims, 6 Drawing Sheets

Related U.S. Application Data

(60) Provisional application No. 62/418,609, filed on Nov. 7, 2016, provisional application No. 62/094,766, filed on Dec. 19, 2014, provisional application No. 62/089,198, filed on Dec. 8, 2014.

(51) Int. Cl.
    *H01G 4/005* (2006.01)
    *H01G 4/012* (2006.01)
    *H01G 4/12* (2006.01)
    *H01G 4/14* (2006.01)
    *H01G 4/18* (2006.01)
    *H01G 4/20* (2006.01)
    *H01G 4/008* (2006.01)

(52) U.S. Cl.
    CPC ............ *H01G 4/18* (2013.01); *H01G 4/206* (2013.01); *H01G 4/306* (2013.01)

(58) Field of Classification Search
    USPC ............... 361/321.1, 301.4, 303, 304, 321.2
    See application file for complete search history.

(56) References Cited

U.S. PATENT DOCUMENTS

| | | |
|---|---|---|
| 2005/0128680 A1 | 6/2005 | Shin et al. |
| 2006/0258327 A1 | 11/2006 | Lee et al. |
| 2008/0158777 A1* | 7/2008 | Sohn ............... H01G 4/232 |
| | | 361/321.1 |
| 2009/0309259 A1 | 12/2009 | Tan et al. |
| 2010/0027192 A1* | 2/2010 | Perry ............... B82Y 30/00 |
| | | 361/323 |
| 2010/0295900 A1 | 11/2010 | Weir |
| 2011/0146042 A1 | 6/2011 | Kelly et al. |

\* cited by examiner

ENHANCED STACKING FOR IMPROVED CAPACITANCE

CROSS-REFERENCE TO RELATED APPLICATIONS

The present application is a continuation-in-part of and claims priority from U.S. patent application Ser. No. 15/533,617 filed Jun. 6, 2017, which is a national stage filing of International Patent Application No. PCT/US2015/064290 filed Dec. 7, 2015, which claims priority from U.S. Provisional Patent Application No. 62/089,198, filed Dec. 8, 2014 and U.S. Provisional Patent Application No. 62/094,766, filed Dec. 19, 2014. The present application also claims priority from U.S. Provisional Patent Application No. 62/418,609, filed Nov. 7, 2016. The entire contents of each of the above-referenced applications is incorporated by reference.

FIELD

The present disclosure is generally related to capacitors and methods of making capacitors.

DESCRIPTION OF RELATED ART

A capacitor can be formed by stacking or layering materials together. For example, a metal-insulator-metal (MIM) capacitor includes layers forming a top conductive electrode, a bottom conductive electrode, and a dielectric material.

Properties of capacitors differ based on factors such as the dielectric constant of dielectric materials used, the thickness of the dielectric material, the geometry (e.g., area or shape) of the conductive electrodes, etc. For example, decreasing the thickness of the dielectric material (or the distance between the electrodes) can increase capacitance of the capacitor but may also increase leakage current of the capacitor.

SUMMARY

In an illustrative aspect, a capacitor includes a floating electrode between active electrodes. When the floating electrode is subjected to an electric field (e.g., when voltage is applied to the active electrodes), charge separation is induced in the floating electrode. The charge separation provides a reverse electric field (e.g., field that is opposite the electric field between the active electrodes). The reverse electric field opposes leakage current between the active electrodes and can result in significant reductions in the magnitude of the leak current. Reduction in leakage current corresponds to an effective increase in insulation resistance of the capacitor. Increasing insulation resistance improves energy storage times by reducing losses due to leakage current.

Energy storage capacity of a capacitor can be increased by increasing capacitance of the capacitor, e.g., increasing the number of active electrodes of the capacitor. However, increasing the number of active electrodes can increase leakage current. The techniques described herein allow the number of active electrodes to be increased (to improve energy storage capacity) in a manner that maintains insulation resistance (and therefore energy storage time) nearly constant as the number of active electrodes is increased.

In a particular illustrative aspect, a capacitor includes a first conductive plate, a second conductive plate, and a floating conductive plate having a first surface closer to the first conductive plate than to the second conductive plate and having a second surface closer to the second conductive plate than to the first conductive plate. In response to an electric field between the first conductive plate and the second conductive plate, charge separation is induced in the floating conductive plate such that a first charge induced on the first surface has a first polarity and a second charge induced on the second surface has a second polarity, where the second polarity is different from the first polarity. The capacitor also includes a dielectric material that separates the floating conductive plate from the first conductive plate and from the second conductive plate.

In another particular aspect, a capacitor includes a stack including a plurality of conductive layers and a plurality of dielectric layers. The plurality of conductive layers includes at least one first electrode layer corresponding to a first polarity and at least one second electrode layer corresponding to a second polarity, where the second polarity is different from the first polarity. The plurality of conductive layers further includes a floating layer between the at least one first electrode layer and the at least one second electrode layer.

In another particular aspect, a capacitor includes a first layer including a first conductive plate associated with a first polarity. The capacitor also includes a second layer that includes the second conductive plate. The first layer does not include the second conductive plate associated with a second polarity different than the first polarity. The capacitor further includes a third layer including a floating conductive plate, where the third layer is located between the first layer and the second layer. The capacitor also includes a dielectric material between the first layer and the third layer and between the third layer and the second layer.

According to another aspect, a method of fabricating a capacitor includes forming a stack including a first dielectric layer between a first conductive layer and a second conductive layer. The method also includes coupling a second dielectric layer and a third conductive layer to the stack such that the second dielectric layer is located between the first conductive layer and the third conductive layer. The method further includes connecting the third conductive layer to a first electrical connector and the second conductive layer to a second electrical connector. The first and second electrical connectors are associated with respective electrical polarities. The first conductive layer is electrically isolated from the first electrical connector and is electrically isolated from the second electrical connector.

Other aspects, advantages, and features of the present disclosure will become apparent after review of the entire application.

DETAILED DESCRIPTION

Figure 1:
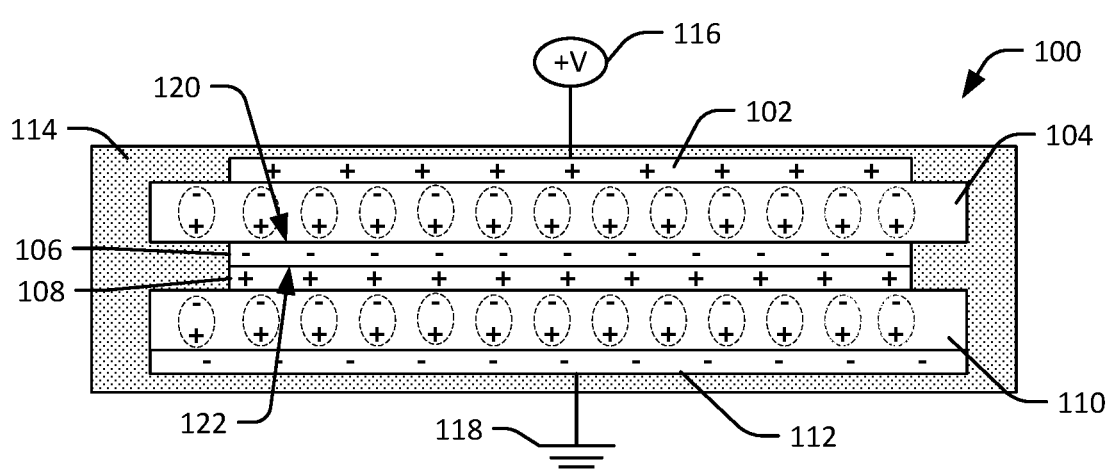
FIG. 1 is a diagram of a cross-sectional side view of a capacitor that includes a floating electrode according to a particular embodiment.

The following description in combination with the figures is provided to assist in understanding particular aspects of the disclosure. The following description focuses on specific implementations and embodiments of the disclosure. This focus should not be interpreted as a limitation on the scope or applicability of the disclosure.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This description should be read to include one or at least one and the singular also includes the plural, or vice versa, unless it is clear that it is meant otherwise. For example, when a single item is described herein, more than one item may be used in place of a single item. Similarly, in some cases, where more than one item is described herein, a single item may be substituted for that more than one item.

Unless otherwise defined, all technical and scientific terms used herein have the same meaning as commonly understood by one of ordinary skill in the art to which the subject matter of the disclosure belongs. The materials, methods, and examples are illustrative only and are not intended to be limiting.

In an illustrative aspect, a capacitor includes multiple active electrodes (e.g., electrodes or conductive plates that are associated with a respective electrical polarity) and at least one floating electrode (or floating conductive plate) between two or more active electrodes of opposite polarity. For example, the capacitor may include a first electrode associated with a first polarity (e.g., a positive electrode) and a second electrode associated with a second polarity (e.g., a negative electrode). In this example, the floating electrode may be positioned between the first electrode and the second electrode and separated from the first electrode and the second electrode by dielectric material. When voltage is applied to the active electrodes, an electric field may be established between the active electrodes (i.e., the active electrodes act as conductive plates of the capacitor). The electric field induces charge separation within the floating electrode, effectively establishing a reverse electric field that opposes the electric field between the active electrodes. The reverse electric field opposes leakage current between the active electrodes, or, stated another way, increases the effective insulation resistance of the capacitor.

In particular embodiments, the capacitor is assembled or formed as a plurality of layers, such as conductive layers separated by dielectric layers. Some of the conductive layers correspond to active electrodes and some of the conductive layers correspond to floating electrodes, as described further below. At least one dielectric layer is positioned between each pair of active electrodes; however, in some implementations, two or more conductive layers corresponding to floating electrodes are in direct contact with one another (i.e., not separated by dielectric material).

FIG. 1 is a diagram of a cross-sectional side view of a capacitor 100 according to a particular illustrative embodiment. The capacitor 100 includes a plurality of conductive layers and a plurality of dielectric layers. The conductive layers form electrodes (e.g., capacitive plates and floating electrodes, as described further below). The dielectric layers separate at least some of the conductive layers, as described further below. For example, in FIG. 1, a first conductive layer corresponds to a first electrode 102 (e.g., a positive plate in the example illustrated in FIG. 1), and a second conductive layer corresponds to a second electrode 112 (e.g., a negative plate in the example illustrated in FIG. 1). The first electrode 102 is separated from the second electrode 112 by one or more dielectric layers, such as a first dielectric layer 104 and a second dielectric layer 110.

The capacitor 100 also includes one or more additional conductive layers corresponding to one or more floating electrodes (also referred to herein as floating conductive plates) between the first electrode 102 and the second electrode 112. In the example illustrated in FIG. 1, the capacitor 100 includes two floating electrodes including a first floating electrode 106 and a second floating electrode 108. The floating electrodes 106, 108 separate the first dielectric layer 104 from the second dielectric layer 110. In some implementations, the floating electrodes 106, 108 are in direct contact with one another. For example, a first surface 120 of the first floating electrode 106 may contact (e.g., directly in contact with) the first dielectric layer 104, and a second surface 122 of the first floating electrode 106 may contact (e.g., directly in contact with) a surface of the second floating electrode 108. In other implementations, the floating electrodes 106, 108 are separated by a dielectric layer.

In FIG. 1, portions of the capacitor 100, such as the electrodes 102, 112 (also referred to as active electrodes), the floating electrodes 106, 108, and the dielectric layers 104, 110, are at least partially encapsulated within a polymer material 114, such as polypropylene. In some implementations, the polymer material 114 has a low relative permittivity. In such implementations, the low relative permittivity of the polymer material 114 can reduce fringe field effects associated with the capacitor 100. For example, without the polymer material 114, if a voltage 116 is applied to the capacitor 100, fringe fields may develop at the exposed ends of the electrodes 102, 112. The presence of fringe fields can increase the leakage current of the capacitor 100. The fringe fields can be excessive (e.g., have an adverse effect on performance of the capacitor 100) at the ends of the capacitor 100 if the dielectric layers 104, 110 are exposed at the ends. For example, the excessive fringe fields can cause a decrease in field intensity within the dielectric layer 104, 110 which decreases the effective insulation resistance of the capacitor 100. Accordingly, reducing or eliminating the fringe fields results in an increase in the effective insulation resistance (and a corresponding decrease in leakage current) of the capacitor 100. The fringe fields can be reduced by covering the ends of the dielectric layers 104, 110 with a low permittivity material, e.g., by at least partially encapsulating portions of the capacitor 100 with the polymer material 114.

During operation, the capacitor 100 stores energy in an electrical field responsive to a voltage difference between the active electrodes. For example, the first electrode 102 may be coupled to the voltage 116 and the second electrode 112 may be coupled to another voltage source or to ground 118. In the example illustrated in FIG. 1, the voltage 116 is a DC voltage with a positive polarity. In this example, the first electrode 102 is associated with a positive polarity, and the second electrode is associated with a negative polarity. However, in other implementations, the voltage 116 may have a different polarity (e.g., a negative polarity), or may have a time varying polarity (e.g., may include an AC voltage source).

The voltage difference across the capacitor 100 generates charge pairs in the first dielectric layer 104 and in the second dielectric layer 110. Additionally, the voltage difference across the capacitor 100 induces charge separation in the floating electrodes 106, 108, illustrated by plus signs ("+") and negative signs ("−") in FIG. 1. The charge separation in the floating electrodes 106, 108 is such that a negative charge is induced in the first floating electrode 106, and a positive charge is induced in the second floating electrode 108. Alternatively, if only one floating electrode, such as only the first floating electrode 106, is present, the negative charge may develop at a first surface (e.g. the first surface 120) of the floating electrode, and the positive charge may develop at a second surface (such as the second surface 122) of the floating electrode.

The charges induced in the floating electrodes 106, 108 generate an electric field that is opposite (or opposed to) the electric field between the first electrode 102 and the second electrode 112. Thus, the electric field of the floating electrodes 106, 108 opposes current flow (e.g., leakage current flow) from the first electrode 102 to the second electrode 112, or vice versa. As a result, leakage current of the capacitor 100 is reduced and an effective insulation resistance of the capacitor 100 is increased (relative to a capacitor that does not include a floating electrode).

Figure 3:
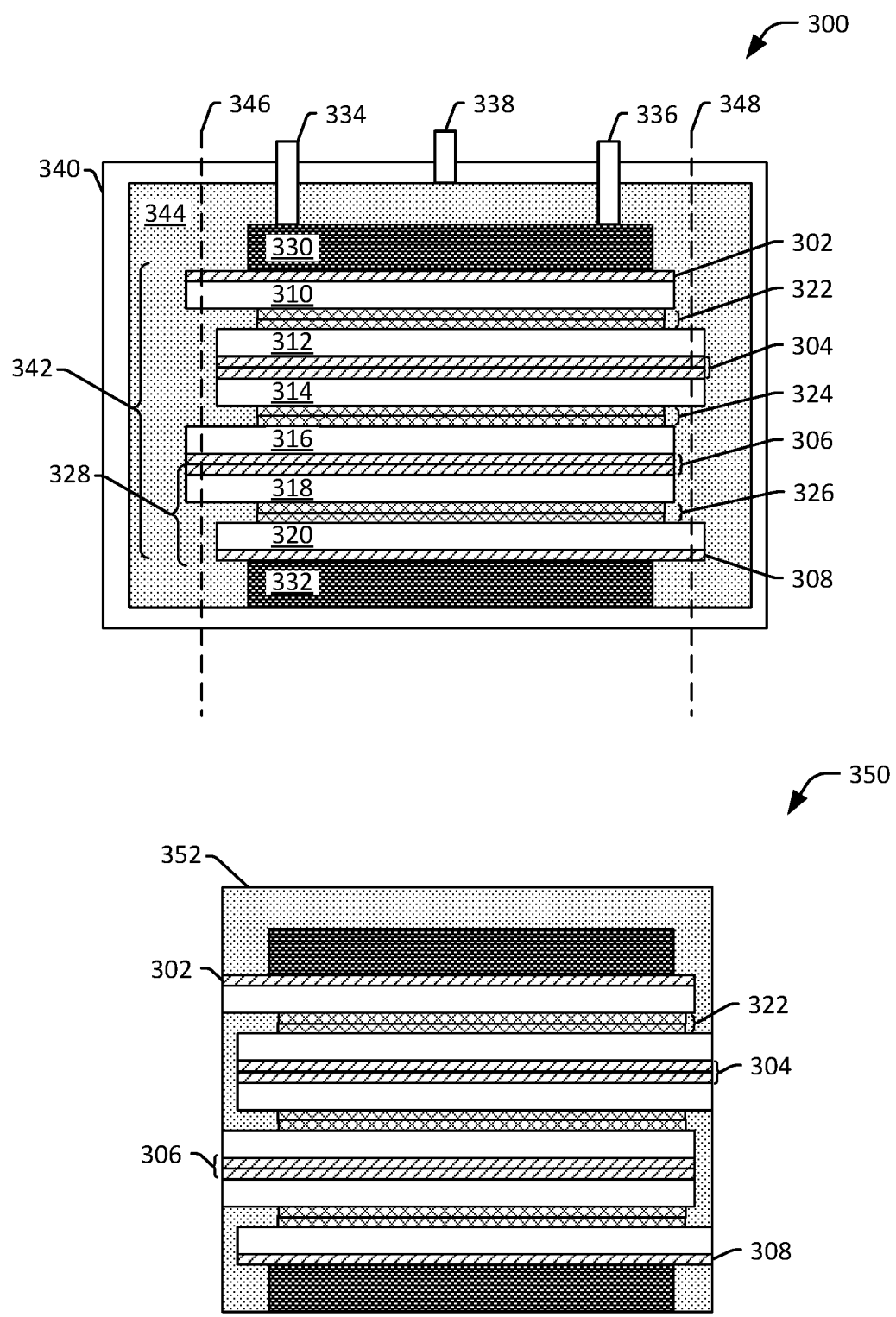
FIG. 3 is a diagram illustrating further stages during manufacture of a capacitor.
Figure 4:
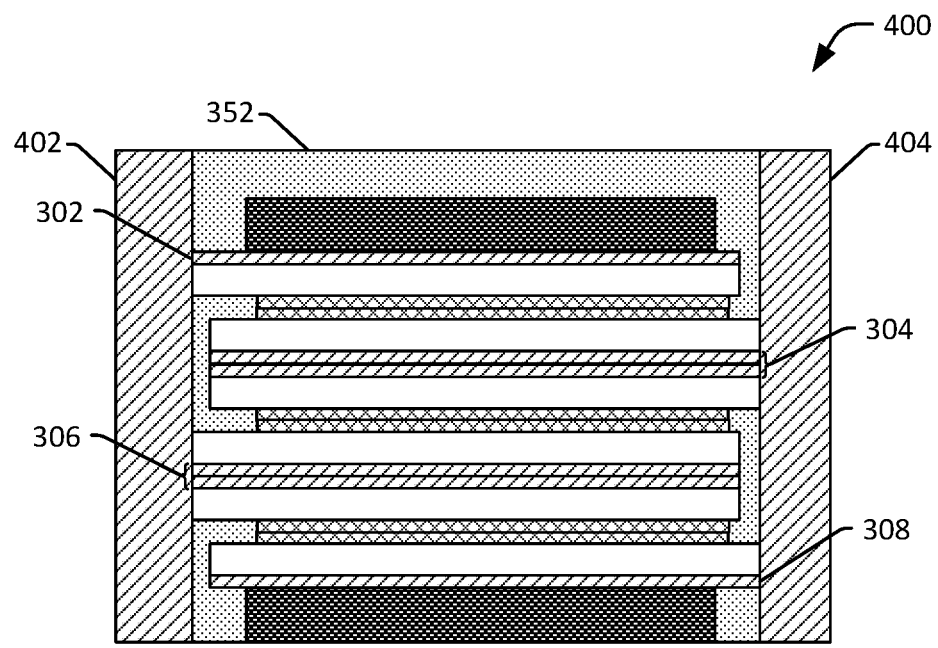
FIG. 4 is a diagram illustrating a particular stage during manufacture of a capacitor.
Figure 6:
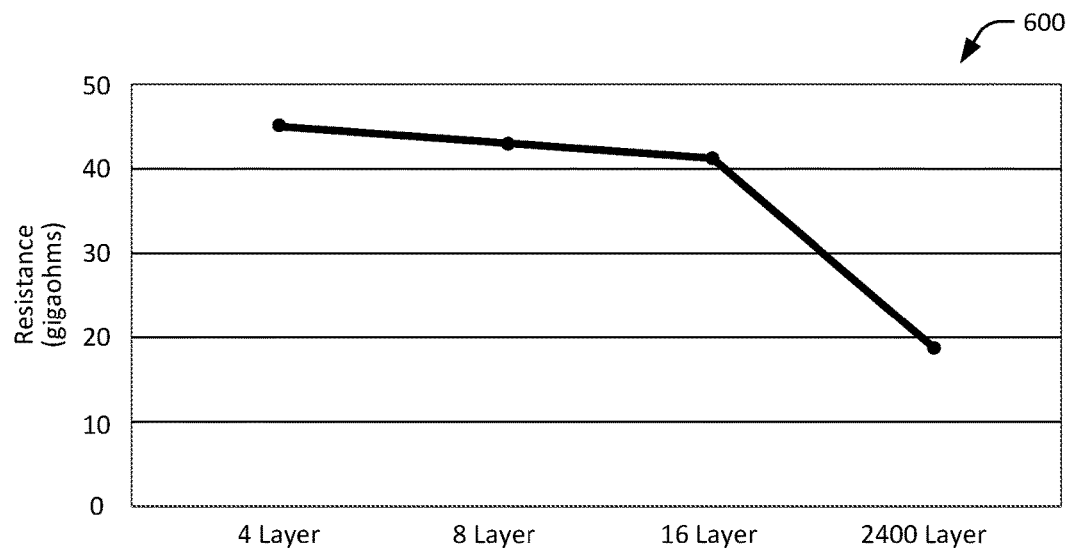
FIG. 6 is a graph that illustrates resistance of capacitors with varying numbers of layers.
Figure 7:
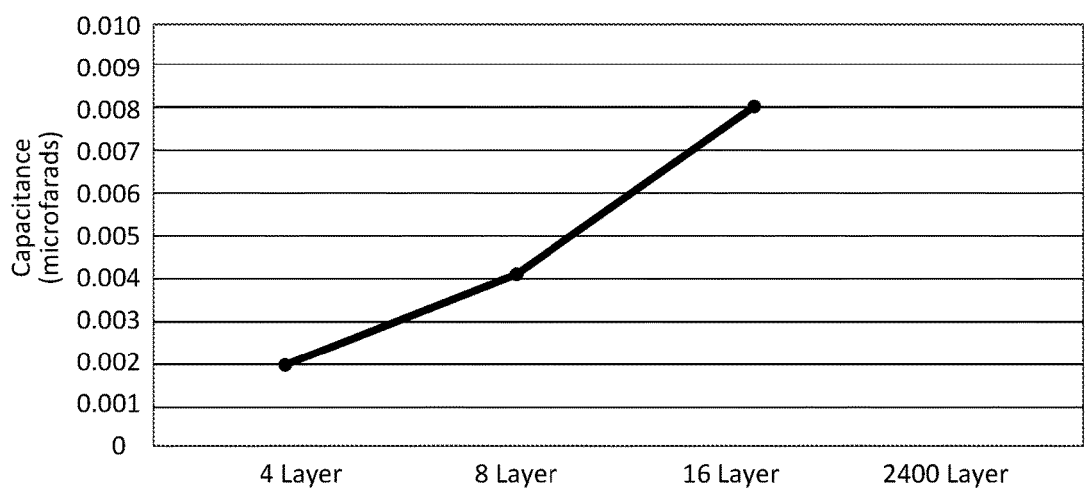
FIG. 7 is a graph that illustrates capacitance of capacitors with varying numbers of layers.

Further, while the capacitor 100 of FIG. 1 includes only a single pair of active electrodes and a single pair of floating electrodes, in other examples (as illustrated in FIGS. 3 and 4) a capacitor may include additional layers of active and floating electrodes. Each additional layer of active electrodes increases total capacitance of the capacitor. Without the floating electrodes, adding more layers of active electrodes tends to decrease the effective insulation resistance of, and tends to increase leakage current of, the capacitor. For example, without adding floating electrodes, as the number of active electrodes of a capacitor is increased (e.g., by stacking layers), the resistance between each pair of active electrodes is in a parallel arrangement relative to resistance between other pairs of active electrodes. As resistors are placed in parallel in a circuit, the total resistance of the circuit is the reciprocal of the sum of the reciprocal resistances. Thus, the total resistance will be less than the smallest resistance in the parallel circuit. However, by adding at least one floating electrode between each pair of active electrodes, the effective insulation resistance of the capacitor can remain nearly constant as the number of active electrodes is increased. For example, as illustrated in FIG. 7, capacitance of a capacitor increases as the number of layers (where each layer corresponds to an active electrode in this example) increases. Additionally, as illustrated in FIG. 6, when at least one floating electrode is positioned between each pair of active electrodes, the total resistance of the capacitor, while not constant, is substantially linear.

As illustrated in FIG. 1, the capacitor 100 includes multiple dielectric layers. In some implementations, a dielectric material used to form the dielectric layers 104 and 110 includes a polymer matrix and ceramic particles dispersed within the polymer matrix. Each dielectric layer 104, 110 can have a specified thickness and a substantially uniform distribution of the ceramic particles. For example, the dielectric layers 104, 110 may be formed using a process that limits or avoids formation of air bubbles, gaps, and cracks.

In accordance with an illustrative embodiment, the polymer matrix can include a polymer, or more than one polymer (e.g., a polymer blend or a co-polymer). For example, the polymer matrix can include poly(ethylene terephthalate) (PET), polycarbonate (PC), polypropylene (PP), polyethylene (PE), poly vinyl chloride (PVC), poly(vinylidenefluoride) (PVDF), poly(methyl methacrylate) (PMMA), polyvinyl alcohol (PVA), poly(ethylene napthalate) (PEN), poly (phenylenesulfate) (PPS), poly(N-isopropylacrylamide) (PNIPAM), polyacrylamide (PAM), a polymer formed using pyromellitic dianyhydride (PMDA) (such as a polyimide), poly(2-oxazoline), polyethylenimine (PEI), poly(vinylpyrrolidone) (PVP), a polymer formed using 4,4'-oxydianiline (ODA) (such as a polyimide), epoxy, or another polymer with acceptable electrical characteristics, or a combination thereof.

In a particular embodiment, the polymer matrix can include an epoxy resin. The epoxy resin can include bisphenol A epoxy resin, aliphatic epoxy resin, aliphatic glycidylether modified bisphenol A epoxy resin, or a combination thereof. Examples of liquid epoxy resins are D.E.R.™ 317, D.E.R.™ 324, D.E.R.™ 325, D.E.R.™ 330, D.E.R.™ 331, D.E.R.™ 332, or D.E.R.™ 337 (each available from The Dow Chemical Company, Midland, Mich.). The polymer matrix may be cured under vacuum (e.g., to remove solvent) while gradually increasing a curing temperature. For example, the polymer matrix may be cured under a vacuum pressure of about 0.1 MPa while gradually (or in a step-wise fashion) increasing the curing temperature from about 70° C. to about 320° C.

In certain embodiments, the polymer matrix may be formed using a polymer or monomer dissolved in a solvent to form a polymer precursor solution. Examples of solvents can include hexafluoroisopropanol (HFIP) or phenol for PET; pyridine for PC; and N-dimethylformamide for PVDF. Additional solvents, such as acetone, 1,2-dichloroethane, N,N-dimethylacetamide (DMA), dimethyl sulfoxide (DMSO), and tetrahydrofuran (THF), can also, or in the alternative, be used. The solvent (or more than one solvent) can be selected to provide a specified or target viscosity of the polymer precursor solution, such that for example, the viscosity can be adjusted based on processes used to form the dielectric layers 104, 110. For example, in spin coating, a particular viscosity or range of viscosities may be used to achieve a specified thickness of the dielectric layers 104, 110. Varying the ratio of the polymer or monomer to the solvent can change the viscosity. For example, increasing the amount of the solvent used to dissolve the polymer generally reduces the viscosity, and using less solvent generally increases the viscosity of the polymer. The vapor pressure of the solvent may also affect the viscosity.

In accordance with yet another embodiment, a chemical constituent may be added to the polymer, to the monomer, or to the polymer precursor solution to produce the target viscosity or a viscosity with a target range. Varying the ratio of the polymer to the chemical constituent may adjust the viscosity of the polymer precursor solution. Examples of the chemical constituent for varying the viscosity of the polymer precursor solution include butyl glycidyl ether, aliphatic glycidyl ether, cresyl glycidyl ether, and ethylhexyl glycidyl ether.

In some embodiments, other chemical constituents may be added to the polymer, to the polymer precursor solution, or to the polymer matrix to improve electrical characteristics of the dielectric layers 104, 110 or of the capacitor 100. For example, a metal acetylacetonate, such as cobalt (III) acetylacetonate, may be added to the polymer, to the polymer precursor solution, or to the polymer matrix. In such embodiments, presence of the metal acetylacetonate in the polymer matrix (after curing) may improve (e.g., increase) a dielectric constant of the dielectric material. In such embodiments, the polymer matrix may be cured under vacuum (e.g., to remove solvent) while gradually increasing a curing temperature. For example, the polymer matrix may be cured under a vacuum pressure of about 0.1 MPa while gradually (or in a step-wise fashion) increasing the curing temperature from about 25° C. to about 185° C.

In some embodiments, a curing agent may be added to the polymer precursor solution. The curing agent may include an amine, such as polyether diamine, an aliphatic polyether diamine, polyoxypropylenediamine, or the like. Thus, in some examples, the polymer precursor solution used to form a polymer matrix of the dielectric layers 104, 110 is a mixture including one or more polymers (or monomers), one or more solvents, one or more curing agents, one or more viscosity modifiers, other chemical constituents, or a combination thereof.

As explained above, the dielectric layers 104, 110 may include ceramic particles dispersed within the polymer matrix. The ceramic particles may make up at least 20 vol %, at least 30 vol %, at least 40 vol %, or at least 50 vol % of a total volume of the polymer matrix and the ceramic particles (or a total volume of a mixture including the polymer precursor solution and the ceramic particles). In some embodiments, the ceramic particles make up not greater than 95 vol %, not greater than 90 vol %, or not greater than 85 vol % of a total volume of the ceramic particles and the polymer matrix (or the total volume of the mixture including the polymer precursor solution and the ceramic particles). For example, the ceramic particles may make up in a range of 20 vol % to 95 vol %, in a range of 30 vol % to 90 vol %, or in a range of 40 vol % to 85 vol % of a total volume of the ceramic particles and the polymer matrix (or the total volume of the mixture including the polymer precursor solution and the ceramic particles). The ceramic particles can include a composition-modified barium titanate (CMBT). In a particular embodiment, the CMBT has a formula $(Ba_{1-\alpha-\mu-v}A_\mu D_v Ca_\alpha)[Ti_{1-x-\delta-\mu'-v'}Mn_\delta A'_{\mu'}D'_{v'}Zr_x]_z O_3$, where A=Ag or La, A'=Dy, Er, Ho, Y, Yb, or Ga; D=Nd, Pr, Sm, or Gd; D'=Nb or Mo; $0.10 \leq x \leq 0.25$; $0 \leq \mu \leq 0.01$, $0 \leq \mu' \leq 0.01$, $0 \leq v \leq 0.01$, $0 \leq v' \leq 0.01$, $0 \leq \delta \leq 0.01$, $0.995 \leq z \leq 1$, and $0 \leq \alpha \leq 0.005$. For example, in one embodiment, the CMBT has the constituents listed in the following table 1.

TABLE 1

| Metal element | Atom fraction | Atomic Wt. | Product | Wt % |
|---|---|---|---|---|
| Ba | 0.9575 | 137.327 | 131.5 | 98.53 |
| Ca | 0.0400 | 40.078 | 1.60 | 1.20 |
| Nd | 0.0025 | 144.242 | 0.36 | 0.27 |
| Total | 1.00 | | | 100 |
| Ti | 0.8150 | 47.867 | 39.01 | 69.92 |
| Zr | 0.1800 | 91.224 | 16.42 | 29.43 |
| Mn | 0.0025 | 54.93804 | 0.14 | 0.25 |
| Y | 0.0025 | 88.9058 | 0.22 | 0.39 |
| Total | 1.00 | | | 100 |

In certain instances, Lanthanum (La) and Tin (Sn) can be used in the CMBT.

According to an embodiment, the CMBT powder can be coated with an organic material to promote dispersion in the polymer matrix. For example, the organic material can include an amphiphilic agent, such as a trialkoxysilane. In this example, an alkyl group of the trialkoxysilane can include, for example, 1 to 5 carbon atoms. In a particular embodiment, a thin layer of coating of the trialkoxysilane may be formed. Examples of the trialkoxysilane include, but are not limited to, amino propyl triethoxysilane, vinyl benzyl amino ethyl amino propyl trimethoxysilane, methacryloxypropyl trimethoxysilane, glycidoxypropyl trimethoxysilane, phenyl trimethoxysilane, or N-(2-aminoethyl)-3-aminopropyltrimethoxysilane. The amphiphilic agent can be chosen such that the organic group matches (e.g., is chemically compatible with) the polymer into which the ceramic particles are being dispersed. Alternatively, the trialkoxysilane functional group can be substituted with a phosphonic, sulfonic, or carbonic acid group.

In a particular embodiment, the CMBT powder can be coated with an amphiphilic agent, such as a silane, as follows:

1. In a 250 mL beaker, combine 100% ethanol and distilled water in a ratio of 15:1 to 20:1, such as combining 154.4 mL of 100% ethanol with 8.125 mL of DI water.
2. Place the beaker on a hot plate with a mixer impeller blade in the solution.
3. Turn up speed dial as fast as possible without splashing or having the solution touch the top of the beaker.
4. Add 2 to 5 mL of silane solution, such as 3.25 mL.
5. Set the heat control around 190° C. to 225° C., such as 215° C. on the heating stand and ensure that this temperature maintains a solution at a desired temperature of 60° C. to 80° C., such as 70° C.
6. Once the desired solution temperature is maintained, slowly add 50 g to 80 g, such as 65 g, of CMBT powder into the solution.
7. Allow the solution to remain at the desired solution temperature while mixing for 0.5 hours to 1.5 hours, such as 1 hour, or until approximately 2 cm to 4 cm, such as 2.5 cm liquid remains. Be careful not to cook or boil to complete dryness.
8. Place the powder like sludge into the vacuum oven at 100° C. to 140° C., such as 120° C., at 5 inches (12.5 cm) water column (WC) for 1 hour or until the silane is complete cured.
9. Break up the powder and distribute the silane evenly between 4 (50 mL) centrifuge tubes.
10. Add 35 mL to 45 mL, such as 40 mL, of ethanol to each tube. Ensure that each tube has approximately the same volume.
11. Shake the tubes vigorously.
12. Centrifuge the tubes for 10 minutes to 30 minutes, such as 20 minutes at 2.0 relative centrifuge force (rcf) to 5.0 rcf, such as 3 rcf.
13. Pour off the ethanol from the top.
14. Using a spatula or other similar tool to break up the solid at the bottom.
15. Add 35 mL to 45 mL, such as 40 mL, of ethanol to each tube. Ensure that each tube has approximately the same volume.
16. Shake the tubes vigorously.
17. Centrifuge the tubes for 10 minutes to 30 minutes, such as 20 minutes at 2.0 rcf to 5.0 rcf, such as 3 rcf.
18. Pour off the ethanol from the top.

19. Using a spatula or other similar tool to break up the solid at the bottom.
20. Place the solids in the vacuum oven overnight at 70° C. to 100° C., such as 90° C., with air flowing (such as 5 inches (12.5 cm) WC).
21. Pestle grind the powder and place back in the vacuum oven at 70° C. to 100° C., such as 90° C., with air flowing (such as 5 inches (12.5 cm) WC) daily until completely dry and ground into a fine powder (at least 3-4 days).

According to an embodiment, the coated CMBT powder is dispersed into the polymer precursor solution through, for example, high turbulence mixing. In the following example illustrates a process of high turbulent mixing process of an epoxy. Other polymers, such as polymers described above, can be used to form a mixture with the coated CMBT powder. A high turbulent mixing system used to perform the high turbulent mixing process can include an ultrasonic unit or another system that can apply turbulent vibrational mixing.

1. Weigh specified amount of the liquid epoxy resin into mixing container.
2. Weigh a specified amount of composition-modified barium titanate powders to add to mixing container.
3. Add specified amount of constituent chemicals to the mixing container.
4. Mix the solution then set intensity to 40% to 70%, such as 60%, on a high turbulent mixing system and mix for 10 min to 1 hour, such as 30 minutes.
5. Remove mixing container from high turbulent mixing system and remove cover to prepare for degassing. Set the degassing intensity to 5% to 20% (depending on viscosity, such as 12%) and degas for 45 min to 150 min, such as 105 minutes, at desired vacuum. Note: the degassing process is where the container is sealed and a vacuum is created to assist in removing the air bubbles from the polymer solution.

In an embodiment, the mixture including the polymer precursor solution and the ceramic particles is formed into the dielectric layer. Different processes may be used to dispose a polymer dielectric layer on a substrate, such as a screen printing process, a tape or sheet casting method, or spin coating. When the mixture of the polymer precursor solution and the ceramic particles includes 20 vol % or more filler (such as the ceramic particles), a dielectric layer formed using a screen printing process or a tape or sheet casting method may take longer to dry (relative to a dielectric layer formed using a spin coating process). Additionally, dielectric layers formed using a screen printing process or a tape or sheet casting method may have a less uniform distribution of ceramic particles than dielectric layers formed using spin coating processes.

A spin coating process may be used to form a dielectric layer (such as one of the first or second dielectric layers 104, 110) by depositing a polymer resin fluid (including the polymer precursor solution and the ceramic particles) onto a substrate. In some implementations, the substrate may be conductive. In such implementations, the conductive substrate may correspond to or may be used to form a conductive layer of the capacitor 100. For example, the second dielectric layer 110 may be formed by spin coating the dielectric material on the second electrode 112 or on a layer used to form the second electrode 112. The spin coating process may use acceleration caused by rotation of the substrate to spread the polymer resin fluid over the substrate to form a thin film of the polymer resin fluid on the surface. The nature of the polymer resin fluid (viscosity, drying rate, percent solids, surface tension, etc.) and the parameters chosen for the spin process can affect final film thickness and other properties of the dielectric layer. Factors such as final rotational speed, acceleration, and fume exhaust contribute to the properties of film of the polymer resin fluid.

The spin coating process may be controlled by tuning parameters of the process to form a dielectric layer with specified uniformity, thickness, and other properties. A subtle variation in the parameters of the spin coating process can result in significant variations in the coated film. Certain effects of these variations are described in embodiments herein.

In an embodiment, the spin coating process includes dispensing a portion of the mixture of the polymer precursor solution and the ceramic particles onto a surface of the substrate. The substrate can be held rigidly onto a spin coater. In an embodiment, the substrate includes a flexible material, such as a metal foil. In another instance, the substrate includes a rigid material, such as a metal coated glass or solvent resistant plastic. The amount of mixture applied to the substrate can depend on the substrate size and shape. In a particular embodiment, an amount of the mixture needed to cover the substrate to the desired thickness is dispensed. Excess fluid may be cast from the edges of the substrate during a subsequent action.

In accordance with an embodiment, the mixture is dispensed using a static dispense, a dynamic dispense, or a combination thereof. According to an illustrative embodiment, static dispense includes depositing a portion of the mixture on or near the center of the substrate. The substrate can be static, such as having a spin speed of 0 rpm. The amount of the mixture dispensed can range from 1 to 10 cc or higher than 10 cc, depending on the viscosity of the mixture, the size of the substrate to be coated, or any of the forgoing. For example, a greater amount of the mixture may be dispensed onto a larger substrate or may be used for a mixture with higher viscosity to provide full coverage of the substrate during the spin action.

In a particular embodiment, the spin coating process includes dynamic dispense. Dynamic dispense can include dispensing the mixture while the substrate is turning at a low speed. For instance, the speed may be in a range of 100 rpm to 500 rpm. Dynamic dispense may allow a smaller amount of the mixture, with respect to the static dispense process, to be used for full coverage of the substrate, because the initial low speed of the substrate may help to spread the mixture over the substrate and reduce the amount needed to wet the entire surface of the substrate. Dynamic dispense may result in less waste of the mixture including the polymer precursor solution and the ceramic particles. Dynamic dispense can also help to reduce or eliminate voids that may form when the mixture or substrate has poor wetting abilities.

According to one embodiment, the spin coating process includes a spin action. The spin action can be performed at several different speeds, such that at least a portion of the spin coating process is performed at a relatively high spin speed relative to the spin speed during the dynamic dispense. The spin speed can range from 1000 rpm to 6000 rpm, depending on the properties of the mixture as well as the substrate. For example, the spin speed can be in a range of 1500 rpm to 3500 rpm. In another embodiment, the spin speed is greater than 3500 rpm. Varying the spin speed can change the final thickness of the dielectric layer. For example, spinning at a higher speed may help to reduce the thickness if a thinner film is desired. According to another embodiment, spinning continues for a duration lasting between 10 seconds and several minutes, such as from 10 seconds to 5 minutes, depending on the properties of the mixture, the specified thickness of the coated film, the properties of the substrate, or any combination of the forgoing.

In a particular embodiment, the spin action transitions between multiple spin speeds according to a spin speed ramp-up profile. The spin action may include different processing times for two or more of the different spin speeds. For example, the spin speed can be 1600 rpm to 3200 rpm for a certain period of time and then changed to not greater than 2500 rpm (e.g. 1200 rpm to 2000 rpm) for another period of time. In a particular example, the first spin speed lasts for less than 20 seconds, for example, 1 second to 18 seconds. In this particular example, the second spin speed lasts for less than 2 minutes, such as 30 seconds to 2 minutes.

During the spinning action, the solvent, if used, may evaporate leaving a thin film including the polymer and CMBT ceramic particles that is stretched by the angular motion. The combination of spin speed and time selected for the spinning action may be used to control the final thickness of the dielectric layer. For example, increasing the spin speeds, the spin times, or both, produces thinner dielectric layers.

The spin speed of the substrate (rpm) affects the magnitude of radial (centrifugal) force applied to the resin (i.e., the polymer and CMBT ceramic particles) as well as the velocity and characteristic turbulence of the air immediately above the resin. To some extent, the spin speed of the spin process may determine the final thickness of the dielectric layer. In a particular embodiment, the thickness of the dielectric layer (also referred to herein as film thickness) may be changed by varying the spin speed. For example, a variation of ±50 rpm can cause a resulting thickness change of 10%. Film thickness can also be a balance between the force applied to shear the resin towards the edge of the substrate and the drying rate which affects the viscosity of the resin. As the resin dries, the viscosity increases until the radial force of the spin process can no longer appreciably move the resin over the surface. At this point, the thickness may not decrease significantly with increased spin time. The acceleration of the substrate towards the final spin speed can also affect properties of the dielectric layer and it may be desired to accurately control acceleration to allow the resin to have linear expansion during the initial spin process.

The spin process can provide a radial (outward) force to the resin, and acceleration can provide a twisting force to the resin. This twisting aids in the dispersal of the resin around topography that might otherwise shadow portions of the substrate from the resin. Acceleration of spinners is programmable with a resolution of 1 rpm/second. In operation, the spin motor can accelerate (or decelerate) in a linear ramp to the final spin speed.

In yet another embodiment, the spin coating process includes drying to remove excess solvents from the resulting dielectric layer. The drying action can be performed after spinning, which may help to further dry the dielectric layer without substantially reducing the thickness of the layer. This can be advantageous for thick dielectric layers since long drying times may be used to provide sufficient physical stability of the dielectric layer before handling. In another embodiment, after a relatively high speed spin coating operation, drying may be performed by reducing the spin speed to a moderate spin speed (e.g., about 25% of the speed used for the high speed spin coating operation) to aid in drying the dielectric layer without significantly changing the thickness of the dielectric layer.

In accordance with an embodiment, the spin coating process includes curing. Curing may be performed after the spinning action to remove the remaining solvent to cure the resin. In an instance, curing may be performed in lieu of drying, particularly when the resin includes the chemical constituent disclosed herein. The curing action can include curing in vacuum, in an oven, or in a vacuum oven. Curing time, curing temperature, and level of vacuum process can affect curing of the resin including the polymer precursor solution and the ceramic particles and can be chosen based on the properties of the polymer.

As disclosed herein, the thickness of the dielectric layer can be adjusted by changing one or any combination of the parameters disclosed herein. In an embodiment, the thickness of each of the dielectric layers 104, 110 is at least 0.1 µm, such that sufficient insulation can be provided to adjacent electrodes. For example, the thickness of the dielectric layers 104, 110 can be at least 0.15 µm, at least 0.28 µm, or even higher. The thickness may be selected based on the target properties of the capacitor 100. In an example, the thickness can be at least 0.6 µm, at least 1 µm, at least 3 µm, or at least 7 µm. In other embodiments, thickness is not greater than 100 µm, as thinner dielectric layer may increase capacitance of the capacitor 100 due to inverse relation between the thickness of the dielectric layer and the capacitance. For instance, the thickness of each of the dielectric layers 104, 110 may not be greater than 90 µm, 80 µm, or 70 µm. In a particular embodiment, the thickness of each of the dielectric layers 104, 110 is not greater than 50 µm. The thickness of each of the dielectric layers 104, 110 can be in a range including any of the minimum to maximum values noted above. For example, the thickness can be in a range of 0.1 µm to 100 µm, 0.28 µm to 90 µm, or 0.6 µm to 80 µm. In a particular embodiment, the thickness is in a range of 3 µm to 50 µm. For example, the thickness may be in a range of 3 µm to 16 µm.

In accordance with one embodiment, each of the dielectric layers 104, 110 has a particular dielectric strength. For example, the dielectric strengths can be at least 30 V/µm, at least 40 V/µm, at least 45 V/µm, or 50 V/µm. In another embodiment, the dielectric strength is not greater than 100 V/µm, such as not greater than 95 V/µm, not greater than 91 V/µm, or not greater than 85 V/µm. The dielectric strength can be within any of the minimum values to maximum values noted above, such as 30 V/µm to 100 V/µm. In a particular embodiment, the dielectric strength is in a range of 40 V/µm to 85 V/µm.

According to another embodiment, each of the dielectric layer 104, 110 has a specified permittivity relative to permittivity of vacuum (also referred to as "relative permittivity"). For example, the relative permittivity of each of the dielectric layers 104, 110 can be at least 30, at least 50, at least 70, or even at least 110, at least 500, at least 1100, at least 2000, or at least 3000. The higher values of relative permittivity, such as 500 and higher, may be achieved by using a relatively more polar polymer, such as a relatively more polar epoxy. In another embodiment, the relative permittivity is no greater than 10,000, no greater than 5000, no greater than 2000, no greater than 900, or no greater than 500. In a particular embodiment, the relative permittivity is in a range of 30 to 1100 or 50 to 500.

Figure 2:
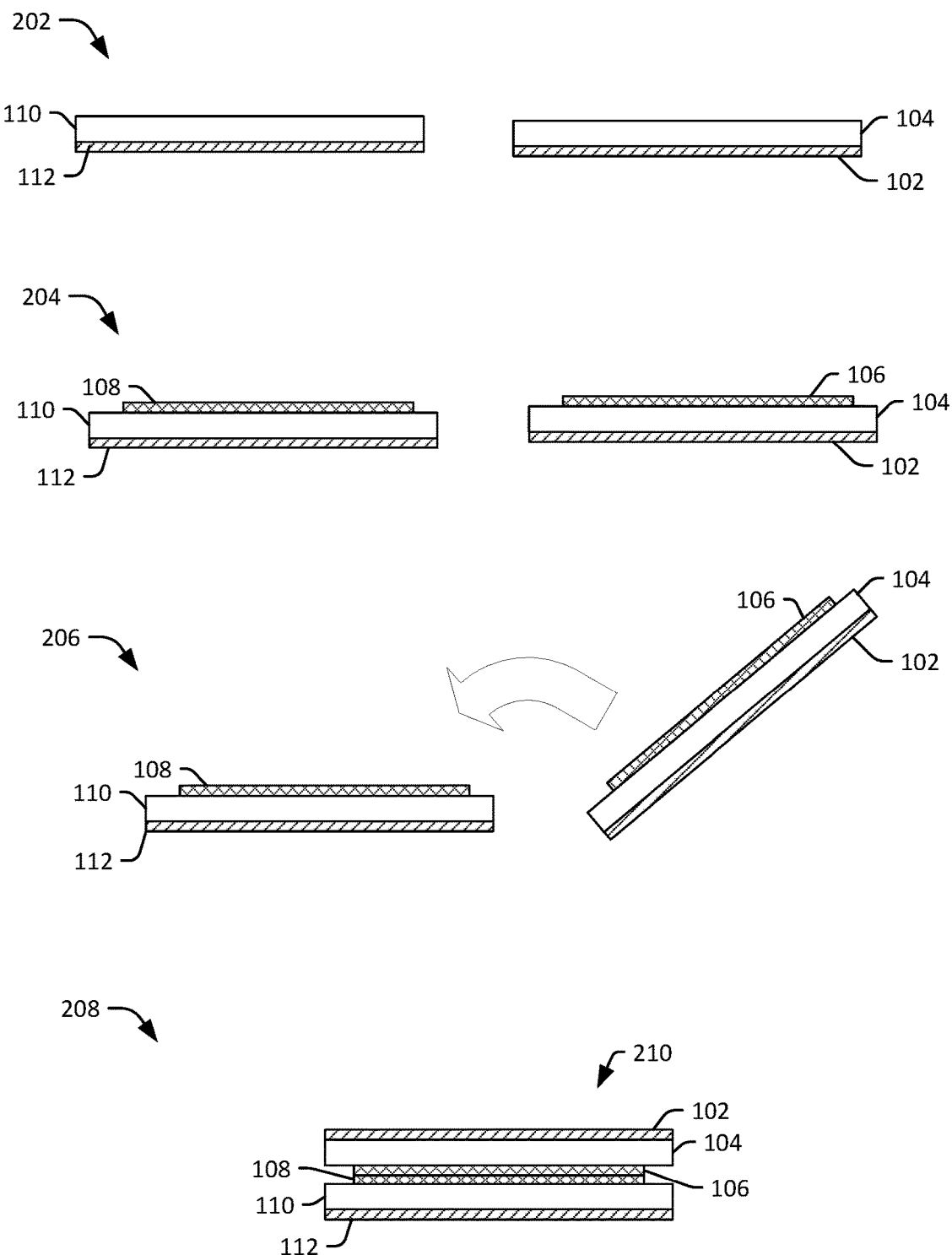
FIG. 2 is a diagram illustrating stages during manufacture of a capacitor.

FIG. 2 is a diagram illustrating stages during a process of manufacturing a capacitor. The process illustrated in FIG. 2 can be used to assemble the capacitor 100 of FIG. 1 or a capacitor including more than two active electrodes. During a first stage 202 of manufacturing the capacitor, the first dielectric layer 104 may be coupled to a conductive layer or a conductive plate corresponding to the first electrode 102. Further, during the first stage 202 of manufacturing the capacitor, the second dielectric layer 110 may be coupled to a conductive layer or a conductive plate corresponding to the second electrode 112. As an example, the first dielectric layer 104 may be formed by spin coating a mixture including a polymer precursor solution and ceramic particles on a substrate. The substrate may include or correspond to the conductive layer that is used to form the first electrode 102. Alternatively, the substrate may be distinct from the first electrode 102, in which case the first dielectric layer 104 may be coupled to the first electrode 102 after the dielectric material forming the dielectric layer 104 cures sufficiently to be movable. Likewise, the second dielectric layer 110 may be formed by spin coating a mixture including a polymer precursor solution and ceramic particles on a substrate.

During a second stage 204 of manufacturing the capacitor, a conductive layer may be applied to the first dielectric layer 104 to form the first floating electrode 106. Likewise, a conductive layer may be applied to the second dielectric layer 110 to form the second floating electrode 108. The conductive layers may include aluminum, gold, copper, chromium, another metal, or a combination thereof. In a particular embodiment, the conductive layers are applied using a sputtering process. The sputtering process causes each conductive layer to adhere tightly to the surface of the respective dielectric layer. Additionally, sputtering enables formation of very thin layers.

During a third stage 206 of manufacturing the capacitor, the first floating electrode 106, the first dielectric layer 104, and the first electrode 102 may be inverted and positioned on the second floating electrode 108, the second dielectric layer 110, and the second electrode 112 to form a stack 210 (illustrated in a fourth stage 208 of FIG. 2). Thus, in the example illustrated in FIG. 2, the first floating electrode 106 is in direct physical and electrical contact with the second floating electrode 108.

After forming the stack 210, the stack 210 may be encapsulated within a polymer, such as the polymer material 114, to form the capacitor 100 of FIG. 1. Alternatively, more layers may be added to the stack 210 to form a capacitor including additional pairs of active electrodes. For example, FIGS. 3 and 4 are diagrams illustrating further stages during manufacture of a capacitor that includes more than one pair of active electrodes.

In FIG. 3, a plurality of conductive layers and a plurality of dielectric layers have been arranged to form a stack 342. The stack 342 includes several sets of conductive layers arranged as pairs of active electrodes. For example, the stack 342 includes a sub-stack 328 that corresponds to the stack 210 of FIG. 2. That is, the sub-stack 328 includes a conductive layer 306 that corresponds to the first electrode 102 of FIG. 2, a dielectric layer 318 that corresponds to the first dielectric layer 104, conductive layers 326 that correspond to the first and second floating electrodes 106, 108, a dielectric layer 320 that corresponds to the second dielectric layer 110, and a conductive layer 308 that corresponds to the second electrode 112.

In addition to the sub-stack 328, the stack 342 includes other conductive layers 302, 322, 304, and 324. Each of the conductive layers corresponds to (e.g., is used to form) a conductive plate that is used as an active electrode or as a floating electrode. For example, the conductive layers 302 and 306 may each be used to form a respective electrode associated with a first electrical polarity (e.g., a positive electrode), as described further below. Similarly, the conductive layers 304 and 308 may each be used to form a respective electrode associated with a second electrical polarity (e.g., a negative electrode). The conductive layers 322, 324, and 326 may be used to form floating electrodes.

As illustrated in FIG. 3, some conductive layers may include more than one metal layer. For example, the conductive layer 326 may include a first portion coupled to the dielectric layer 320 and a second portion coupled to the dielectric layer 318. In this example, the first portion of the conductive layer 326 may be sputtered onto the dielectric layer 320 as described above. Similarly, the second portion of the conductive layer 326 may be sputtered onto the dielectric layer 318. The first portion and the second portion of the conductive layer 326 may be assembled together (e.g., in direct physical and electrical contact with one another) during formation of the stack 342. Similarly, the conductive layers 322, 304, 324, 306 may include more than one layer of conductive material. For purposes of the following description, when multiple layers of conductive material operate together to form a single active electrode or floating electrode, such layers are treated as a single conductive layer unless otherwise noted in specific context. Thus, for example, the first portion and the second portion of the conductive layer 326 are referred to herein collectively as the conductive layer 326. Each pair of conductive layers that perform different functions (e.g., active electrodes as compared to floating electrodes) are separated by at least one of the dielectric layers 310, 312, 314, 316, 318, 320.

In FIG. 3, the stack 342 is positioned within an injection molding system 300. The injection molding system 300 includes a mold 340 with a plurality of ports 338 (only one of which is illustrated). One or more of the ports 338 may be used to receive a polymer 344 to encapsulate the stack 342, and one or more others of the ports 338 may operate as vents to release gas as the polymer 344 is injected into the mold 340.

During injection molding, pressure may be applied to the stack 342 to maintain respective positions of the layers of the stack 342, to maintain a position of the stack 342 relative to the mold 340, or both. Pressure pins 334, 336 may be used to apply pressure to the stack 342. Additionally, one or more capping layers 330, 332 may be used to protect the layers of the stack 342 from damage due to the pressure applied by the pressure pins 334, 336, to distribute force across the stack 342, etc. The capping layers 330, 332 may be formed of or include a polymer.

FIG. 3 also illustrates a view 350 of an encapsulated stack 352 after the injection molding process and after cutting the encapsulated stack 352 along cut lines 346, 348. Cutting the encapsulated stack 352 along the cut lines 346, 348 exposes ends of the conductive layers used to form active electrodes. For example, in FIG. 3, one end of each of the conductive layers 302 and 306 is exposed on a first side of the encapsulated stack 352, and one end of each of the conductive layers 304 and 308 is exposed on a second side of the encapsulated stack 352. Floating layers are entirely encapsulated within the polymer 344 and are not exposed by cutting along the cut lines 346, 348, as illustrated by the conductive layers 322 which do not have any exposed material in FIG. 3.

FIG. 4 illustrates a multi-layer capacitor 400. In FIG. 4, electrical connectors 402 and 404 have been attached to the encapsulated stack 352 of FIG. 3. A first electrical connector 402 is electrically connected to the exposed ends of the conductive layers 302 and 306 such that the conductive layers 302 and 306 form active electrodes associated with a polarity of a voltage applied to the first electrical connector 402. Likewise, a second electrical connector 404 is electrically connected to the exposed ends of the conductive layers 304 and 308 such that the conductive layers 304 and 308 form active electrodes associated with a polarity of a voltage applied to the second electrical connector 404.

Thus, the process illustrated by the manufacturing process stages of FIGS. 3 and 4 enables manufacture of a capacitor that includes more than one pair of active electrodes. Although FIGS. 3 and 4 illustrate four active layers (e.g., conductive layers 302, 304, 306 and 308), in other embodiments, layer stacking as illustrated in FIGS. 3 and 4 may be used form capacitors with more active layers or fewer active layers. For example, by adding more dielectric layers and more conductive layers, a capacitor with more than four active layers may be formed. Similarly, by omitting one or more dielectric layers and one or more conductive layers, a capacitor with fewer than four active layers may be formed, such as the capacitor 100 of FIG. 1.

Figure 5:
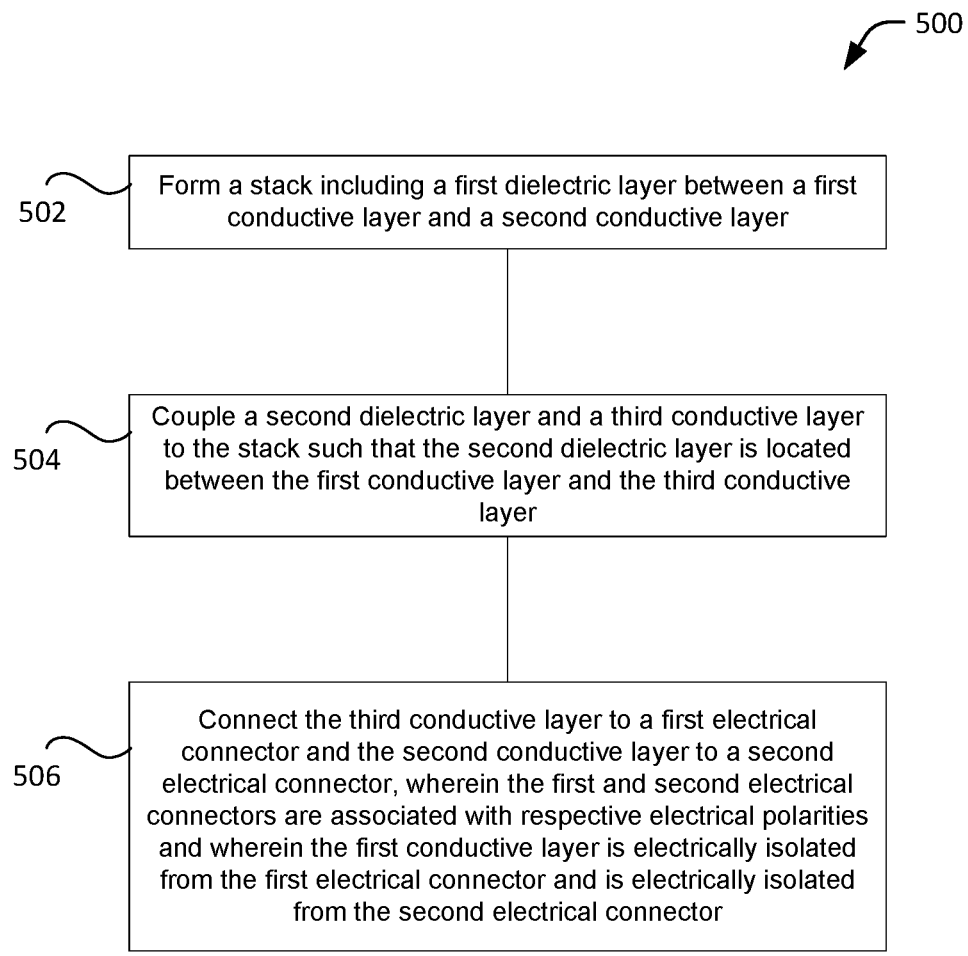
FIG. 5 is a flow chart of a method of manufacturing a capacitor.

FIG. 5 is a flow chart of a method 500 of manufacturing a capacitor. For example, the method 500 may be used to form the capacitor 100 of FIG. 1, or a multi-layer capacitor, such as the capacitor 400 of FIG. 4.

The method 500 includes, at 502, forming a stack that includes a first dielectric layer between a first conductive layer and a second conductive layer. For example, as described with reference to FIG. 1, the dielectric layer may be formed by applying a polymer precursor solution and ceramic particles to a substrate using a spin coating process. To illustrate, a composition including a polymer matrix and ceramic particles dispersed within the polymer matrix may be deposited on the substrate and cured. The substrate may include a conductive layer (such as the second conductive layer) that corresponds to (or is used to form) a conductive plate or electrode of the capacitor. The first conductive layer may include or correspond to a metal deposited on the first dielectric layer. For example, the first conductive layer may include gold, aluminum, chromium, copper, another metal, or a combination thereof, sputtered on the first dielectric layer.

The method 500 also includes, at 504, coupling a second dielectric layer and a third conductive layer to the stack such that the second dielectric layer is located between the first conductive layer and the third conductive layer. For example, as illustrated in FIG. 2, after a stack including a first conductive layer (i.e., the first electrode 102 in this example), the first dielectric layer 104, and a second conductive layer (i.e., the first floating electrode 106 in this example) is formed, the stack may be coupled to another stack that includes the second dielectric layer 110 and a third conductive layer (i.e., the second electrode 112 in this example). The layers may be arranged such that the second dielectric layer 110 is located between the first conductive layer (i.e., the first electrode 102 in this example) and the third conductive layer (i.e., the second electrode 112 in this example).

As another example, a stack may be formed that includes the dielectric layer 320 of FIG. 3, the conductive layer 308, and a portion of the conductive layer 326 that is coupled to the dielectric layer 320. In this example, the dielectric layer 320 corresponds to the first dielectric layer, the conductive layer 308 corresponds to the second conductive layer, and the portion of the conductive layer 326 that is coupled to the dielectric layer 320 corresponds to the first conductive layer. A second dielectric layer and a third conductive layer may be coupled to the stack by adding the dielectric layer 318 and the portion of the conductive layer 306 that is coupled to the dielectric layer 318. In this example, the dielectric layer 318 corresponds to the second dielectric layer, and the portion of the conductive layer 306 that is coupled to the dielectric layer 318 corresponds to the third conductive layer. Other layers may also be added. For example, continuing with reference to FIG. 3, a fourth conductive layer (e.g., the portion of the conductive layer 326 that is coupled to the dielectric layer 318 may be positioned between the second dielectric layer (e.g., the dielectric layer 318 in this example) and the first conductive layer (e.g., the portion of the conductive layer couple to the dielectric layer 320 in this example) such that the fourth conductive layer is in direct contact with the first conductive layer. Additionally, a third dielectric layer (e.g., the dielectric layer 314) and a fifth conductive layer (e.g., the conductive layer 304) may be coupled to the stack such that the third dielectric layer is disposed between the fifth conductive layer and the third conductive layer (e.g., the conductive layer 306). Further, a sixth conductive layer (e.g., the conductive layer 324) and a fourth dielectric layer (e.g., the dielectric layer 316) may be positioned between the fifth conductive layer (e.g., the conductive layer 304) and the third conductive layer (e.g., the conductive layer 306). In this example, the sixth conductive layer corresponds to a floating electrode.

The method 500 also includes, at 506, connecting the third conductive layer to a first electrical connector and coupling the second conductive layer to a second electrical connector. The first and second electrical connectors are associated with respective electrical polarities. The first conductive layer is electrically isolated from the first electrical connector and is electrically isolated from the second electrical connector. For example, as illustrated in FIG. 1, the second electrode 112 (corresponding to the third conductive layer in this example) is connected to ground 118 (e.g., a first polarity), and the first electrode 102 (corresponding to the second conductive layer in this example) is coupled to the voltage 116 (e.g., a second polarity). Further, in this example, the floating electrodes 106 and 108 (either or both of which correspond to the first conductive layer in this example) are electrically isolated from each electrical connector (e.g. the electrodes 106 and 108 are floating).

As another example, referring to FIG. 4, the conductive layer 308 (corresponding to the second conductive layer in this example), and the conductive layer 304 (corresponding to the fifth conductive layer in this example) are each connected to the second electrical connector 404. Additionally, the conductive layer 306 (corresponding to the third conductive layer in this example) is connected to the first electrical connector 402. The conductive layer 326 (corresponding to the first and fourth conductive layers in this example) and the conductive layer 324 (corresponding to the sixth conductive layer in this example) are electrically isolated from the electrical connectors 402, 404.

In a particular embodiment, the method 500 also includes encapsulating the stack, the second dielectric layer, the third conductive layer, and other dielectric or conductive layers (if present). For example, the various layers may be encapsulated (e.g., using an injection molding process) in a polymer, such as the polymer material 114 of FIG. 1 or the polymer 344 of FIG. 3. The encapsulating material may have a relative permittivity of at least 30 to facilitate damping of fringe fields.

Thus, the method 500 may be used to manufacture a capacitor with a high insulation resistance. Increasing insulation resistance improves energy storage times by reducing losses due to leakage current. Further, adding active layers can improve energy storage capacity by increasing capacitance of the capacitor. The techniques described herein allow layers to be added to improve energy storage capacity in a manner that maintains insulation resistance (and therefore energy storage time) nearly constant as layers are added, thus reducing or avoiding increases in leakage current that can occur as the number of active layers of a capacitor increase.

Various illustrative components, blocks, configurations and steps have been described above generally in terms of their functionality. Skilled artisans may implement the described functionality in varying ways for each particular application, but such implementation decisions should not be interpreted as causing a departure from the scope of the present disclosure.

The description of the disclosed aspects is provided to enable a person skilled in the art to make and use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown and described herein but is to be accorded the widest scope possible consistent with the principles and novel features as defined by the following claims.

What is claimed is:

1. A capacitor comprising:
   a first conductive plate;
   a second conductive plate;
   a floating conductive plate having a first surface closer to the first conductive plate than to the second conductive plate and having a second surface closer to the second conductive plate than to the first conductive plate, wherein, in response an electric field between the first conductive plate and the second conductive plate, charge separation is induced in the floating conductive plate such that a first charge induced on the first surface has a first polarity and a second charge induced on the second surface has a second polarity, the second polarity different from the first polarity;
   a dielectric material separating the floating conductive plate from the first conductive plate and from the second conductive plate;
   a third conductive plate and at least one dielectric layer between the third conductive plate and the first conductive plate, wherein the first conductive plate is located between the third conductive plate and the second conductive plate; and
   at least one additional floating conductive plate between the third conductive plate and the first conductive plate.

2. The capacitor of claim 1, further comprising a second floating conductive plate in contact with the floating conductive plate.

3. The capacitor of claim 2, wherein, in response to the electric field between the first conductive plate and the second conductive plate, charge separation is induced in the second floating conductive plate.

4. The capacitor of claim 2, wherein the dielectric material includes:
   a first dielectric layer coupled to the floating conductive plate and to the first conductive plate; and
   a second dielectric layer coupled to the second floating conductive plate and to the second conductive plate.

5. The capacitor of claim 1, further comprising a polymer that at least partially encapsulates the first conductive plate, the second conductive plate, the floating conductive plate, and the dielectric material.

6. The capacitor of claim 1, wherein the dielectric material includes a polymer matrix and ceramic particles dispersed within the polymer matrix.

7. The capacitor of claim 6, wherein the ceramic particles include composition-modified barium titanate that comprises $(Ba_{1-\alpha-\mu-\nu}A_{\mu}D_{\nu}Ca_{\alpha})[Ti_{1-x-\delta-\mu'-\nu'}Mn_{\delta}A'_{\mu'}D'_{\nu'}Zr_x]_zO_3$, where A=Ag or La, A'=Dy, Er, Ho, Y, Yb, or Ga; D=Nd, Pr, Sm, or Gd; D'=Nb or Mo; $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, $0.995 \leq z \leq 1$, and $0 \leq \alpha \leq 0.005$.

8. The capacitor of claim 6, wherein the ceramic particles are coated with an amphiphilic agent.

9. The capacitor of claim 1, wherein the dielectric material is arranged in layers, each layer of the dielectric material having a thickness in a range of 0.1 microns to 100 microns.

10. The capacitor of claim 1, wherein the dielectric material has a relative permittivity of at least 30.

11. The capacitor of claim 1, wherein the floating conductive plate includes aluminum, gold, copper, or chromium.

12. A capacitor comprising:
    a stack including a plurality of conductive layers and a plurality of dielectric layers, the plurality of conductive layers including at least one first electrode layer corresponding to a first polarity, including at least one second electrode layer corresponding to a second polarity, and including at least one third electrode layer associated with the second polarity, the at least one first electrode layer disposed between the at least one third electrode layer and the at least one second electrode layer, the second polarity different from the first polarity, the plurality of conductive layers further including a floating layer between the at least one first electrode layer and the at least one second electrode layer and at least one additional floating layer between the at least one third electrode layer and the at least one first electrode layer.

13. The capacitor of claim 12, wherein the plurality of conductive layers further comprises a second floating layer in contact with the floating layer.

14. The capacitor of claim 13, wherein the plurality of dielectric layers includes:
    a first dielectric layer coupled to the floating layer and coupled to the at least one first electrode layer; and
    a second dielectric layer coupled to the second floating layer and coupled to the at least one second electrode layer.

15. The capacitor of claim 12, further comprising at least one dielectric layer of the plurality of dielectric layers between the at least one third electrode layer and the at least one first electrode layer.

16. The capacitor of claim 12, further comprising a polymer that at least partially encapsulates the stack.

17. The capacitor of claim 12, wherein at least one dielectric layer of the plurality of dielectric layers comprises a polymer matrix and ceramic particles dispersed within the polymer matrix.

18. The capacitor of claim 17, wherein the ceramic particles include composition-modified barium titanate comprising $(Ba_{1-\alpha-\mu-\nu}A_{\mu}D_{\nu}Ca_{\alpha})[Ti_{1-x-\delta-\mu'-\nu'}Mn_{\delta}A'_{\mu'}D'_{\nu'}Zr_x]_zO_3$, where A=Ag or La, A'=Dy, Er, Ho, Y, Yb, or Ga; D=Nd, Pr, Sm, or Gd; D'=Nb or Mo; $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, $0.995 \leq z \leq 1$, and $0 \leq \alpha \leq 0.005$.

19. The capacitor of claim 17, wherein the ceramic particles are coated with an amphiphilic agent.

20. The capacitor of claim 12, wherein at least one dielectric layer of the plurality of dielectric layers has a thickness in a range of 0.1 microns to 100 microns.

21. The capacitor of claim 12, wherein at least one dielectric layer of the plurality of dielectric layers has a relative permittivity of at least 30.

22. The capacitor of claim 12, wherein the floating layer includes aluminum, gold, copper, or chromium.

23. A capacitor comprising:
   a first layer including a first conductive plate associated with a first polarity, the first layer not including a second conductive plate associated with a second polarity different than the first polarity;
   a second layer including the second conductive plate;
   a third layer including a floating conductive plate, the third layer between the first layer and the second layer;
   a fourth layer including a second floating conductive plate, the second floating conductive plate in contact with the floating conductive plate; and
   a dielectric material between the first layer and the third layer and between the third layer and the second layer.

24. The capacitor of claim 23, wherein the dielectric material includes:
   a first dielectric layer coupled to the floating conductive plate and coupled to the first conductive plate; and
   a second dielectric layer coupled to the second floating conductive plate and coupled to the second conductive plate.

25. The capacitor of claim 23, further comprising a fifth layer including a third conductive plate associated with the second polarity, wherein the first layer is between the fifth layer and the second layer.

26. The capacitor of claim 25, further comprising at least one additional floating conductive plate between the fifth layer and the first layer.

27. The capacitor of claim 25, further comprising at least one additional dielectric layer between the fifth layer and the first layer.

28. The capacitor of claim 23, further comprising a polymer that at least partially encapsulates the first layer, the second layer, the third layer, and the dielectric material.

29. The capacitor of claim 23, wherein the dielectric material includes a polymer matrix and ceramic particles dispersed within the polymer matrix.

30. The capacitor of claim 29, wherein the ceramic particles include composition-modified barium titanate comprising $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_z O_3$, where A=Ag or La, A'=Dy, Er, Ho, Y, Yb, or Ga; D=Nd, Pr, Sm, or Gd; D'=Nb or Mo; $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, $0.995 \leq z \leq 1$, and $0 \leq \alpha \leq 0.005$.

31. The capacitor of claim 29, wherein the ceramic particles are coated with an amphiphilic agent.

32. The capacitor of claim 23, wherein the dielectric material is arranged in layers, each layer of the dielectric material having a thickness in a range of 0.1 microns to 100 microns.

33. The capacitor of claim 23, wherein the dielectric material has a relative permittivity of at least 30.

34. The capacitor of claim 23, wherein the floating conductive plate includes aluminum, gold, copper, or chromium.

35. A method of fabricating a capacitor, the method comprising:
   forming a first stack including a first conductive plate, a first floating conductive plate, and a first dielectric material separating the first floating conductive plate from the first conductive plate;
   forming a second stack including a second conductive plate, a second floating conductive plate, and a first dielectric material separating the second floating conductive plate from the second conductive plate;
   coupling the first stack and the second stack such that a first surface of the first floating conductive plate is closer to the first conductive plate than to the second conductive plate and a second surface of the first floating conductive plate is closer to the second conductive plate than to the first conductive plate and the second floating conductive plate is in contact with the first floating conductive plate, wherein, in response an electric field between the first conductive plate and the second conductive plate, charge separation is induced in the first floating conductive plates such that a first charge induced on the first surface has a first polarity and a second charge induced on the second surface has a second polarity, the second polarity different from the first polarity.

36. The method of claim 35, further comprising encapsulating the first and second stacks using an injection molding process.

37. The method of claim 35, wherein forming the first stack comprises forming the first dielectric material by curing a composition including a polymer matrix and ceramic particles dispersed within the polymer matrix.

38. The method of claim 37, wherein forming the first stack further comprises depositing a metal on the first dielectric material.

39. The method of claim 38, wherein the metal is deposited using a sputtering process.

40. A capacitor comprising:
   a first conductive plate;
   a second conductive plate;
   a floating conductive plate having a first surface closer to the first conductive plate than to the second conductive plate and having a second surface closer to the second conductive plate than to the first conductive plate, wherein, in response an electric field between the first conductive plate and the second conductive plate, charge separation is induced in the floating conductive plate such that a first charge induced on the first surface has a first polarity and a second charge induced on the second surface has a second polarity, the second polarity different from the first polarity;
   a dielectric material separating the floating conductive plate from the first conductive plate and from the second conductive plate; and
   a second floating conductive plate in contact with the floating conductive plate.

41. The capacitor of claim 40, wherein, in response to the electric field between the first conductive plate and the second conductive plate, charge separation is induced in the second floating conductive plate.

42. The capacitor of claim 41, wherein the dielectric material includes:
   a first dielectric layer coupled to the floating conductive plate and to the first conductive plate; and
   a second dielectric layer coupled to the second floating conductive plate and to the second conductive plate.

43. The capacitor of claim 40, further comprising a polymer that at least partially encapsulates the first conductive plate, the second conductive plate, the floating conductive plate, and the dielectric material.

44. The capacitor of claim 40, wherein the dielectric material includes a polymer matrix and ceramic particles dispersed within the polymer matrix.

45. The capacitor of claim 40, wherein the dielectric material is arranged in layers, each layer of the dielectric material having a thickness in a range of 0.1 microns to 100 microns.

46. The capacitor of claim 40, wherein the dielectric material has a relative permittivity of at least 30.

47. The capacitor of claim 40, further comprising a third conductive plate and at least one dielectric layer between the third conductive plate and the first conductive plate, wherein the first conductive plate is located between the third conductive plate and the second conductive plate.

48. The capacitor of claim 47, further comprising at least one additional floating conductive plate between the third conductive plate and the first conductive plate.

* * * * *